Figure 1:
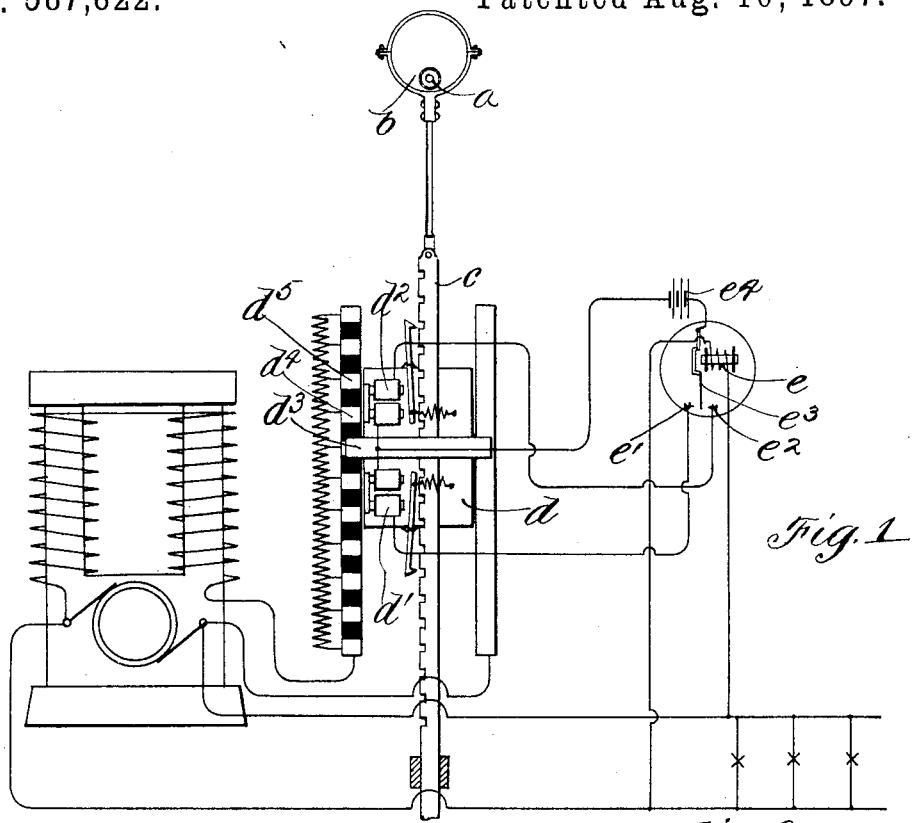

(No Model.) 2 Sheets—Sheet 1.

E. W. G. C. HOFFMANN & J. H. F. GÖRGES.
AUTOMATIC ELECTRICAL REGULATING DEVICE.

No. 587,822. Patented Aug. 10, 1897.

Witnesses:

Inventors:
Ernst W. G. C. Hoffmann,
Johannes H. F. Görges,
By Barton Brown
Attorneys.

(No Model.) 2 Sheets—Sheet 2.
E. W. G. C. HOFFMANN & J. H. F. GÖRGES.
AUTOMATIC ELECTRICAL REGULATING DEVICE.

No. 587,822. Patented Aug. 10, 1897.

Witnesses:

Inventors:
Ernst W. G. C. Hoffmann,
Johannes H. F. Görges,
By Borton Brown
Attorneys.

UNITED STATES PATENT OFFICE.

ERNST WILHELM GUSTAV CARL HOFFMANN, OF CHARLOTTENBURG, AND JOHANNES HEINRICH FRIEDRICH GÖRGES, OF BERLIN, GERMANY, ASSIGNORS TO THE SIEMENS & HALSKE ELECTRIC COMPANY OF AMERICA, OF CHICAGO, ILLINOIS.

AUTOMATIC ELECTRICAL REGULATING DEVICE.

SPECIFICATION forming part of Letters Patent No. 587,822, dated August 10, 1897.

Application filed April 17, 1896. Serial No. 587,951. (No model.) Patented in Germany February 28, 1891, No. 60,150.

*To all whom it may concern:*

Be it known that we, ERNST WILHELM GUSTAV CARL HOFFMANN, residing at Charlottenburg, and JOHANNES HEINRICH FRIEDRICH GÖRGES, residing at Berlin, Germany, subjects of the Emperor of Germany, have invented new and useful Improvements in Automatic Electrical Regulating Devices, (Case No. 627,) of which the following is a specification, and for which Letters Patent have been granted in Germany, No. 60,150, dated February 28, 1891.

Our invention relates to an automatic electrical regulating device applicable to various purposes.

The object of our invention is to provide a device that will automatically regulate the machinery for which it is adapted, such as the voltage of a dynamo-circuit or storage-battery system or the speed of a steam-engine, &c.

By the use of the device of the present invention connected for the regulation of the working circuit of a dynamo extremely prompt and accurate automatic regulation of the voltage or amperage of said circuit may be secured even under unfavorable conditions that would render the ordinary types of apparatus designed for the same purpose unreliable and irregular in action. Such regulation is usually accomplished by means of an ordinary double-contact relay sensitive to variation from the normal current, the said variation causing the relay contact-arm to engage with one of two contact-points, and by means of some form of current-regulating device which is connected with and operated by the said relay the variation is automatically corrected. These relays may be wound so as to be highly susceptible to any variation from the normal current, but when so constructed are likewise liable to be easily disturbed by external means and thereby fail to maintain the exact current which the circuit demands. For instance, the vibration of the wall or jarring of the machinery or building may prevent an exact regulation of current, when instruments of the ordinary type are used, by reason of vibration imparted to the contact-arm of the relay, thereby causing it to make irregular or unnecessary contacts.

The difficulties to be met with in the use of current-regulators controlled automatically are numerous, such as irregularity or failure of response to current variation, continuance of the operation of the device after a normal current is established, and similar disturbing conditions.

The relay and current-regulator of the present invention successfully operate and in a manner to avoid the difficulties above mentioned and insure certain and exact current regulation.

Our device consists of an electromagnetic clutch to which is imparted a reciprocating movement by an eccentric mounted upon a continuously-revolving shaft, the said clutch being actuated by an improved form of relay to operate some type of regulating apparatus adapted to the machinery to which it is applied. In a current-regulator to which our invention is applicable the clutch operates a contact controlling the resistance in the dynamo field-circuit.

A further feature of the present invention relates to a relay provided with a damping device consisting of a copper disk which forms a part of the relay contact-arm, maintained within the field of an electromagnet normally excited, whereby induced currents are set up in the copper disk and any vibratory tendency of the contact-arm is counteracted.

Figure 2:
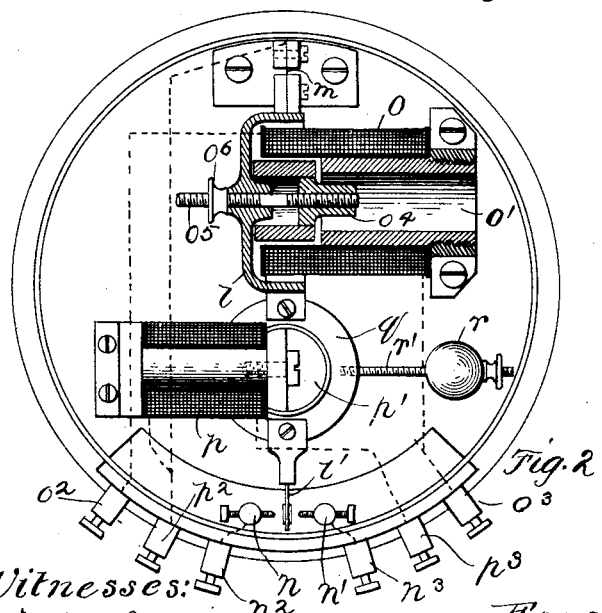
Figure 3:
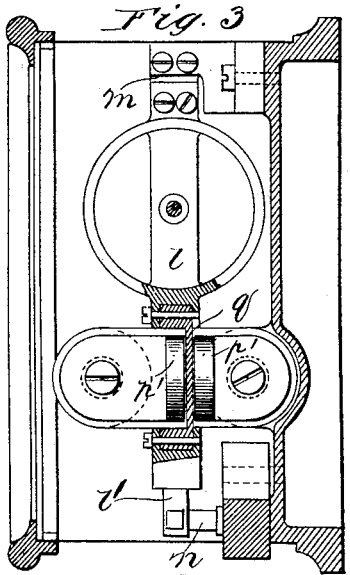
Figure 4:
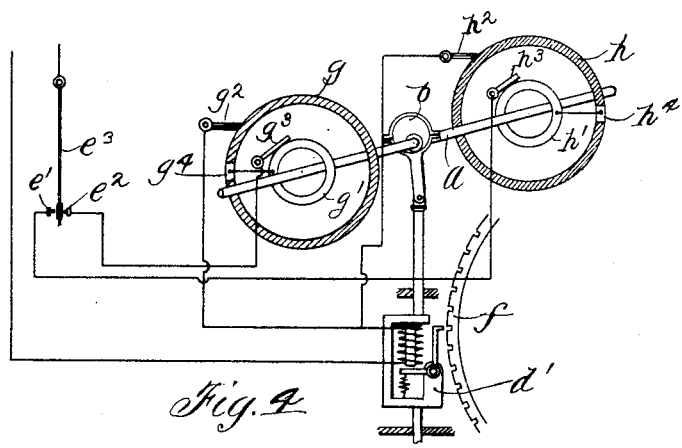
Figure 5:
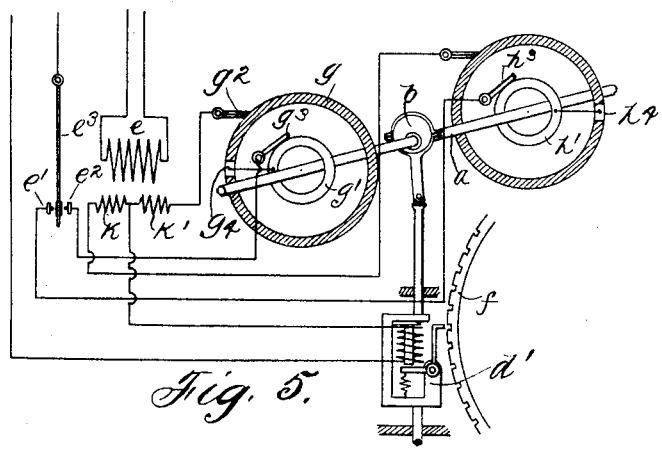

Referring to the drawings accompanying this application, Figure 1 is a diagrammatic view of the regulating device, consisting of a rack-bar and clutches operating thereon, together with the dynamo and relay and their respective circuits. Fig. 2 is a front view of the relay and damping device, partly in section. Fig. 3 is a side view of the same, also partly in section. Fig. 4 is a diagrammatic view of a modification of the device, requiring the use of but one clutch. Fig. 5 is a similar view showing a relay with auxiliary coils and a contact device therefor.

Like letters refer to like parts throughout the several figures.

Upon a continuously-rotating shaft $a$ is provided an eccentric $b$, which serves to impart a reciprocating movement to the rack-bar $c$. Sliding between parallel guides is the contact-frame $d$, bearing the electromagnetic clutches $d'$ $d^2$ and the resistance contact-arm $d^3$, traveling over the contacts $d^4$ $d^5$, &c., of the dynamo field resistance. The working circuit of the dynamo to be regulated is connected in parallel with the solenoid $e$ of the regulating-relay. The relay contact-arm $e^3$ is adjusted to remain midway between the contact-points $e'$ $e^2$ when the normal current is maintained in the working circuit. Contact-points $e'$ $e^2$ are respectively connected with electromagnetic clutches $d'$ $d^2$, and a source of electric current $e^4$ is situated between the relay-arm and the solenoid of the said clutches.

As long as normal current continues to flow through the relay-solenoid $e$ the apparatus remains inoperative, but immediately the current varies the solenoid is correspondingly affected. Assuming that the current has increased above the normal, arm $e^3$ will be attracted by the solenoid $e$, and its lower end will engage with contact-point $e^2$. Current will flow through the magnetic clutch $d^2$, which will engage with the rack-bar upon its upward stroke and move the contact-arm $d^3$ into engagement with contact $d^4$, thereby increasing the resistance in circuit with the fields. If this does not serve to sufficiently reduce the current, the operation will be repeated until sufficient resistance has been cut in to reduce the current to its normal flow. If, on the contrary, the current has decreased, solenoid $e$ is weakened, contact-arm $e^3$ makes connection with point $e'$, and clutch $d'$ is energized to engage the teeth upon the rack-bar on its downward stroke, so that resistance is cut out of circuit with the fields.

Referring to Figs. 2 and 3, the contact-arm $l$ of the relay is suspended from the top by spring $m$ and bears at its lower end an extension $l'$, provided with platinum contacts adapted to make connection with either of the contact-screws $n$ or $n'$, which are connected with the binding-posts $n^2$ and $n^3$. The relay-solenoid $o$, connected with binding-posts $o^2$ and $o^3$, is excited by the current to be regulated. In the drawings the core of the magnet $o'$ is represented hollow, before which is adjustably mounted the armature $o^4$ upon the relay contact-arm by means of a screw and lock-nut $o^5$ and $o^6$. The solenoid $p$ of the damping-electromagnet is connected between binding-posts $p^2$ $p^3$. Connection is also made between the upper end of the relay contact-arm and binding-post $p^2$. The extended pole-shoes $p'$ $p'$ of the damping-electromagnet are circular in form, within the magnetic field of which is suspended the copper disk $q$, connected with and forming a part of the relay contact-arm. The weight $r$, laterally adjustable upon the screw-threaded arm $r'$, is mounted upon the relay contact-arm in position to oppose the attractive influence of the relay-magnet. Through the binding-posts $o^2$ $o^3$ the current requiring regulation is conducted to the solenoid $o$, and the weight $r$ is adjusted upon the arm $r'$ to exactly counterbalance the attractive force of the relay-magnet when the normal current is supplied thereto. In this position no contact is made between the end of the contact-arm and either of the contact-screws $n$ $n'$, but if the current thereafter varies from the normal contact will be made with one or the other of the contact-screws, and current regulation is secured by means of the current-regulator described above, which is connected therewith. The damping device is supplied with a constant current which, passing through the solenoid $p$, produces a magnetic field between its poles, in which the copper disk $q$ of the relay contact-arm is suspended, thus setting up induced currents therein, which counteract any vibratory tendencies imparted to said arm from without.

In the modifications illustrated in Figs. 4 and 5 the same result is accomplished by the use of a single electromagnetic clutch $d'$, to which is imparted a vertical movement by the eccentric $b$, the said clutch engaging with teeth provided upon the periphery of the wheel $f$, controlling the regulating resistance whenever current flows through the solenoid thereof. By means of a device hereinafter described current is supplied thereto only when the extreme point of the upward or downward stroke is reached, so that the wheel $f$ is rotated step by step either in one direction or the other, according to the period in which current flows through the solenoid.

Mounted upon the shaft $a$, carrying the eccentric $b$ and continuously revolving therewith, are contact-rings $g$ $g'$ and $h$ $h'$, insulated one from another, upon which the brushes $g^2$ $g^3$ and $h^2$ $h^3$ respectively bear. The rings $g$ and $h$ are constructed of insulating material, with the exception of the contacts $g^4$ and $h^4$, connected, respectively, with the rings $g'$ and $h'$ and mounted opposite one another in such position as to make contact with their respective brushes only when the eccentric is at the top or bottom of its stroke.

When by current variation the relay-arm $e^3$ engages with contact $e'$, current flows through the solenoid of the clutch, which is thereby actuated to engage with the teeth upon the periphery of the wheel $f$ when the clutch is at the lowest point of the stroke by reason of the circuit being open until contact $h^4$ is revolved to engage with the brush $h^2$. Thus by repetition of the operation, if necessary, sufficient resistance is cut out by revolution of wheel $f$ in one direction to properly increase the current in the working circuit, and similarly it is revolved in the other direction, thereby increasing the resistance in the field-circuit by reason of the clutch being actuated at the top of its stroke by current from the relay-arm $e^3$ in contact with point $e^2$ through brush $g^3$, ring $g'$, contact $g^4$, revolved to engage brush $g^2$, thence through the magnet. In each case the circuit is opened shortly after the clutch engages the wheel $f$, but the said clutch is retained in position by friction therewith until the stroke is completed, when it is withdrawn from contact by a spring. In Fig. 5 the same device is illustrated having the auxiliary coils $k$ and $k'$ in the relay wound respectively differentially and cumulatively to oppose and augment the magnetic effect of the relay-solenoid $e$ upon the relay contact-arm $e^3$, whereby its engagement with points $e'$ $e^2$ can be made with any desired amount of force to prevent sparking at those points and insure continuous contact while the current is flowing through the same, the circuit being opened and closed upon the contacts $g^4$ and $h^4$ where any arcing must occur.

We have described our invention in connection with auxiliary relay-coils and contact-rings, which open the relay-circuit in advance of the movement of the relay-arm, whereby arcing at the relay-contacts is prevented, but these features in their individual capacity form no part of the present invention, having been described and claimed in an application filed by E. W. G. C. Hoffmann, April 17, 1896, Serial No. 587,947.

Having described our invention, what we claim as new, and desire to secure by Letters Patent, is—

1. In an electric regulating device, the combination with an element having a reciprocating movement, of a regulating arm or lever, an electromagnetic clutch adapted to connect the reciprocating element and the regulating-arm, whereby motion is imparted thereto and the desired regulation is accomplished, and means for actuating the said clutch at either extreme of the stroke of said reciprocating element; substantially as described.

2. In an electric regulating device, the combination with an element having a reciprocating movement, of a regulating arm or lever, an electromagnetic clutch adapted to connect the reciprocating element and the regulating-arm, whereby motion is imparted thereto and the desired regulation accomplished, a relay in connection with the apparatus to be regulated controlling the electromagnetic clutch, and means for directing current through the said relay and clutch at either extreme of the stroke of said reciprocating element; substantially as described.

3. In a relay, the combination with the actuating-magnet, of a contact-arm disposed before said magnet, contacts provided in said relay with which the contact-arm is adapted to engage, a damping-magnet, and a disk provided upon the contact-arm near the point of its engagement with the contacts, the said disk being maintained in the field of the damping-magnet, whereby the contact-arm is shielded from vibratory tendencies imparted from without the relay, substantially as described.

4. In a relay, the combination with an actuating-magnet, of a contact-arm $l$ mounted before said magnet, contacts $n$ $n'$ with which the lower end of said contact-arm is adapted to engage and close the controlled circuits, a damping-electromagnet provided with extended pole-pieces $p$ $p'$, and a disk $q$ mounted upon the contact-arm near the point of its electrical engagement with the contacts $n$ $n'$, said disk being maintained in the field of the damping-electromagnet, whereby the contact-arm is prevented from altering the controlled circuits by reason of external vibration imparted to the device, substantially as described.

5. In an electric regulating device, the combination with an electromagnetic clutch having a reciprocating movement, of a regulating-arm adapted to be actuated by the said clutch, a relay for controlling the said clutch, and means for closing the circuit through the relay and the said clutch when the latter is at either extreme of its reciprocating stroke; substantially as described.

6. In an electric regulating device, the combination with an electromagnetic clutch having a reciprocating movement, of a regulating arm or lever adapted to be actuated by the said clutch, a relay for controlling the said clutch, auxiliary coils wound respectively to oppose and assist the magnetic influence of the relay-magnet upon the relay contact-arm, and means for closing the circuit through the magnetic clutch, the relay-contact and the respective auxiliary relay-coil when the said clutch is at either extreme of its reciprocating stroke; substantially as described.

7. In an electric regulating device, the combination with an element having a reciprocating movement, of an electromagnetic clutch adapted to be moved thereby, a rack-bar controlling a regulating arm or lever adapted to be engaged and moved in one direction or the other by the said clutch, a relay controlling the said clutch, and means for operating the said clutch when it is at either extreme of its reciprocating stroke; substantially as described.

8. In an electric automatic regulating device, the combination with the continuously-revolving shaft $a$, of an eccentric $b$ mounted thereon, an electromagnetic clutch $d'$ to which is imparted a reciprocating movement by the eccentric $b$, a rack-bar $f$ controlling the regulating arm or lever adapted to be engaged by the said clutch and moved step by step in one direction or the other, a relay provided with double contact-points, the relay contact-arm normally remaining midway between the said points, either of which forms a terminal of the circuit through the electromagnet of the clutch, contact-rings $g\ g'$ and $h\ h'$ adapted to respectively close the circuit through the corresponding relay contact-points and the electromagnet of the clutch when the latter is at the upper or lower point of its stroke; substantially as described.

In testimony whereof we affix our signatures in presence of two witnesses.

ERNST WILHELM GUSTAV CARL HOFFMANN.
JOHANNES HEINRICH FRIEDRICH GÖRGES.

Witnesses:
    PAUL ROEDIGER,
    JULIUS ZINGLER.